United States Patent
Lal et al.

(10) Patent No.: US 9,330,200 B2
(45) Date of Patent: May 3, 2016

(54) SYSTEM AND METHOD FOR PRESENTING INPUT SUGGESTIONS IN INPUT FIELDS OF A SPECIFIC TYPE IN WEB PAGES BY REPLACING THE INPUT FIELD WITH A COMBO BOX

(71) Applicant: Capital Intellect Inc., Wellesley, MA (US)

(72) Inventors: Ranjan Lal, Wellesley, MA (US); Brian D. Boodman, Somerville, MA (US); Eric Patacchiola, Quincy, MA (US)

(73) Assignee: CAPITAL INTELLECT INC., Wellesley, MA (US)

( * ) Notice: Subject to any disclaimer, the term of this patent is extended or adjusted under 35 U.S.C. 154(b) by 552 days.

(21) Appl. No.: 13/760,786

(22) Filed: Feb. 6, 2013

(65) Prior Publication Data

US 2013/0226952 A1    Aug. 29, 2013

Related U.S. Application Data

(60) Provisional application No. 61/603,775, filed on Feb. 27, 2012, provisional application No. 61/676,654, filed on Jul. 27, 2012.

(51) Int. Cl.
*G06F 17/30* (2006.01)
*H04L 29/08* (2006.01)
*G06F 17/22* (2006.01)

(52) U.S. Cl.
CPC ........ *G06F 17/3097* (2013.01); *G06F 17/2247* (2013.01); *G06F 17/30899* (2013.01); *H04L 67/02* (2013.01)

(58) Field of Classification Search
CPC ..... G06F 3/048; G06F 17/30; G06F 17/2247; G06N 5/02; H04L 67/02
USPC .......................................... 715/221, 758, 751
See application file for complete search history.

(56) References Cited

U.S. PATENT DOCUMENTS

| | | |
|---|---|---|
| 7,246,308 B1 | 7/2007 | Leblang |
| 2004/0098304 A1 | 5/2004 | Truong et al. |

(Continued)

OTHER PUBLICATIONS

Supplementary European Search Report in Application EP 13 75 5084, dated Jul. 21, 2015.

(Continued)

*Primary Examiner* — Cesar Paula
*Assistant Examiner* — Jian Huang
(74) *Attorney, Agent, or Firm* — Sean D. Detweiler, Esq.; Morse, Barnes-Brown & Pendleton, P.C.

(57) ABSTRACT

Systems and methods display input suggestions on web pages having an input field for receiving a specific type of user input. A module stored on a user device is remote from a database containing the input suggestions. The module detects the presence of any input fields of a specific type in a web page. For each detected input field of the specific type, the module generates a combo box that is displayed so as to cover and visually replace the input field. The combo boxes display input suggestions contained in the database. The database can be updated to add or remove input suggestions for particular websites determined to be valid or invalid at those websites. Analysis of the validity of the input suggestions can be based on page analyses sent from the module and performed before and after any submission of an input suggestion.

17 Claims, 9 Drawing Sheets

(56) References Cited

U.S. PATENT DOCUMENTS

| | | |
|---|---|---|
| 2007/0005576 A1* | 1/2007 | Cutrell et al. .................... 707/3 |
| 2008/0300970 A1 | 12/2008 | Scheibe |
| 2009/0138808 A1* | 5/2009 | Moromisato et al. ......... 715/758 |
| 2009/0144234 A1 | 6/2009 | Sharif |
| 2009/0254856 A1 | 10/2009 | Cwajbaum |
| 2010/0070448 A1* | 3/2010 | Omoigui ........................ 706/47 |
| 2010/0131342 A1 | 5/2010 | Thibedeau et al. |
| 2011/0047010 A1 | 2/2011 | Arnold et al. |
| 2011/0167359 A1 | 7/2011 | Weisberg et al. |
| 2011/0320245 A1 | 12/2011 | Nayak et al. |
| 2013/0159784 A1* | 6/2013 | Rossi .......................... 714/47.1 |

OTHER PUBLICATIONS

International Search Report for International Application PCT/US2013/24942, dated Apr. 19, 2013.

* cited by examiner

SYSTEM AND METHOD FOR PRESENTING INPUT SUGGESTIONS IN INPUT FIELDS OF A SPECIFIC TYPE IN WEB PAGES BY REPLACING THE INPUT FIELD WITH A COMBO BOX

RELATED APPLICATION

This application claims priority to, and the benefit of, co-pending U.S. Provisional Application No. 61/603,775, filed Feb. 27, 2012, and co-pending U.S. Provisional Application No. 61/676,654, filed Jul. 27, 2012, for all subject matter contained therein. The disclosures of said provisional applications are hereby incorporated by reference in their entirety.

FIELD OF THE INVENTION

The present invention relates to input suggestions for display in a web page. More particularly, the present invention provides systems and methods for presenting, in a combo box displayed within a user interface (UI) environment of a web page, input suggestions for an input field contained in the web page.

BACKGROUND OF THE INVENTION

Many coupon code websites provide users with lists of coupon codes or other promotional codes for use at specific websites. For example, a user navigating to such a coupon code website can search the site for coupon codes available for use at a particular online store from which the user intends to make a purchase. The user can then browse the various coupon codes presented by the website, in search of a code that would reduce the cost, etc. of his/her particular purchase at the online store. In many instances, the coupon codes presented on the coupon code websites are often submitted by users, thereby "crowdsourcing" the task of coupon code submission and allowing a greater number of coupon codes to be displayed.

However, such coupon code websites are associated with numerous drawbacks. For example, they do not provide users with an ability to easily enter or submit the displayed coupon codes to the intended online store. Instead, users must copy and paste the coupon codes from the coupon code website to the online store or other purchase website. Furthermore, known coupon code websites often display many invalid user-submitted coupon codes. For example, coupon codes may continue to be displayed on such coupon code websites for weeks after they have expired.

SUMMARY

There is a need for systems and methods that more easily allow independent collections of coupon codes to be entered on websites for which the coupon codes are intended. Furthermore, there is a need for systems and methods that validate user-submitted coupon codes based on actual performance of those codes when submitted to the intended websites. The present invention is directed toward solutions to address these and other needs, in addition to having other desirable characteristics that will be appreciated by one of skill in the art upon reading the present specification.

In accordance with one example embodiment of the present invention, a computer implemented method is provided for displaying input suggestions stored on a remote computing system for entry into a specific type of input field. At least one input suggestion for entry into a specific type of input field can be sent though an output device to a user device. The at least one input suggestion can be stored on the remote computing system. Upon the user device requesting or accessing a web page, an input field in the web page can be determined, using at least one processor, to be of the specific type. Based on the step of determining that the input field in the web page is of the specific type, a combo box for presenting the at least one input suggestion can be generated using at least one processor. The combo box can be caused to be included in a display with the web page in such a way that the combo box visually replaces the input field in the display. User input in the combo box can be enabled to be submitted through the web page.

In accordance with aspects of the present invention, the step of determining that the input field in the web page is of the specific type further can include determining that the input field is not currently hidden from view. Using at least one processor, a change in the document object model of the web page can be detected, and the step of determining that the input field in the web page is of the specific type can be performed based on the step of detecting the change in the document object model of the web page.

In accordance with yet further aspects of the present invention, the step of determining whether any input fields in the web page are of the specific type can include executing one or more instructions that are specific to the web page, a website that includes the web page, or a domain to which the web page belongs. The step of generating the combo box for presenting the at least one input suggestion can include generating the combo box as a display overlay that is independent from the web page. The step of generating the combo box for presenting the at least one input suggestion can include generating the combo box in a format for display by a plug-in extension of a web browser used to display the web page. The step of generating the combo box for presenting the at least one input suggestion can include generating the combo box in a format suitable for being input into a document object model of a web browser used to display the web page.

In accordance with further aspects of the present invention, the step of generating the combo box for presenting the at least one input suggestion can include copying or utilizing information pertaining to the presentation of the input field in the web page. The information pertaining to the presentation of the input field in the web page can include font of the input field, background of the input field, border of the input field, color of the input field, size of the input field, style of the input field, or any combination thereof. The information can be transferred from cascading style sheets to a native format of a renderer used to render the combo box. The combo box can be rendered by a web browser engine and the information can be copied by the web browser engine into the combo box. The step of generating the combo box for presenting the at least one input suggestion can include obtaining a screenshot of the input field and using the screenshot to render the combo box. The combo box can include a text entry field and an input suggestion indicator, and visibility and interaction capabilities of the text entry field can be caused to be blocked.

In accordance with another example embodiment of the present invention, a computer implemented method is provided for displaying and collecting input suggestions. At least one input suggestion associated with a web page can be received through an input device on a user device. The at least one input suggestion can be stored in one or more databases on a remote computing system. A combo box for presenting the at least one input suggestion can be generated using at least one processor. The combo box can be displayed on at least one presentation component in conjunction with the web page. The one or more databases can be automatically updated to include, as associated with the web page, user input that is entered into the combo box, submitted through the web page, and determined to be absent from the one or more databases.

In accordance with another example embodiment of the present invention, a computer implemented method is provided for displaying input suggestions based on validation analysis. A plurality of input suggestions associated with a web page can be output through an output device to each of a plurality of users. The plurality of input suggestions can be stored in at least one database. A plurality of page analyses can be received through an input device, and each of the plurality of page analyses can provide results of a submission of one the plurality of input suggestions to the web page by one of the plurality of users. A validity of one or more of the plurality of input suggestions can be determined using at least one processor based at least in part on the received plurality of page analyses. Any of the plurality of input suggestions determined to have a validity that fails to meet one or more threshold criteria can be removed from the at least one database using at least one processor.

In accordance with yet another example embodiment of the present invention, a computer implemented method is provided for displaying input suggestions stored on a remote computing system for entry into a specific type of input field. At least one input suggestion for entry into a specific type of input field can be received though an input device on a user device. The at least one input suggestion can be stored on the remote computing system. Upon the user device requesting or accessing a web page, whether any input fields in the web page are of the specific type and are not hidden from view can be determined using at least one processor. For each input field determined to be of the specific type and not hidden from view, a combo box for presenting the at least one input suggestion can be generated using at least one processor. The combo box can include one or more user interface elements that are independent from the web page. Using at least one processor, the combo box can be caused to be displayed with the web page on at least one presentation component in such a way that the combo box overlays the input field of the web page. Using at least one processor, any user input in the combo box can be duplicated in the input field of the web page.

In accordance with an example embodiment of the present invention, a computer implemented method for displaying input suggestions stored on a remote computing system for entry into a specific type of input field is provided. A user device can receive, though an input device, at least one input suggestion for entry into a specific type of input field. The at least one input suggestion can be stored on the remote computing system. Upon the user device requesting or accessing a web page, it can be determined using at least one processor that an input field in the web page is of the specific type. Based on the step of determining that the input field in the web page is of the specific type, an input suggestion indicator for presenting the at least one input suggestion can be generated using at least one processor. The input suggestion indicator can be caused to be included in a display with the web page in conjunction with the input field. Using at least one processor, the at least one input suggestion can be caused to be presented in the input suggestion indicator.

In accordance with further aspects of the present invention, the at least one input suggestion can be caused to be presented based on user input entered into the input field of the web page. The input suggestion indicator can be caused to be included in the display with the web page based on user input entered into the input field of the web page.

In accordance with an example embodiment of the present invention, one or more computer storage devices containing downloadable instructions stored thereon can be provided. Execution of the instructions (e.g., after being downloaded) by at least one processor can cause any of the methods of the present invention described herein to occur.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
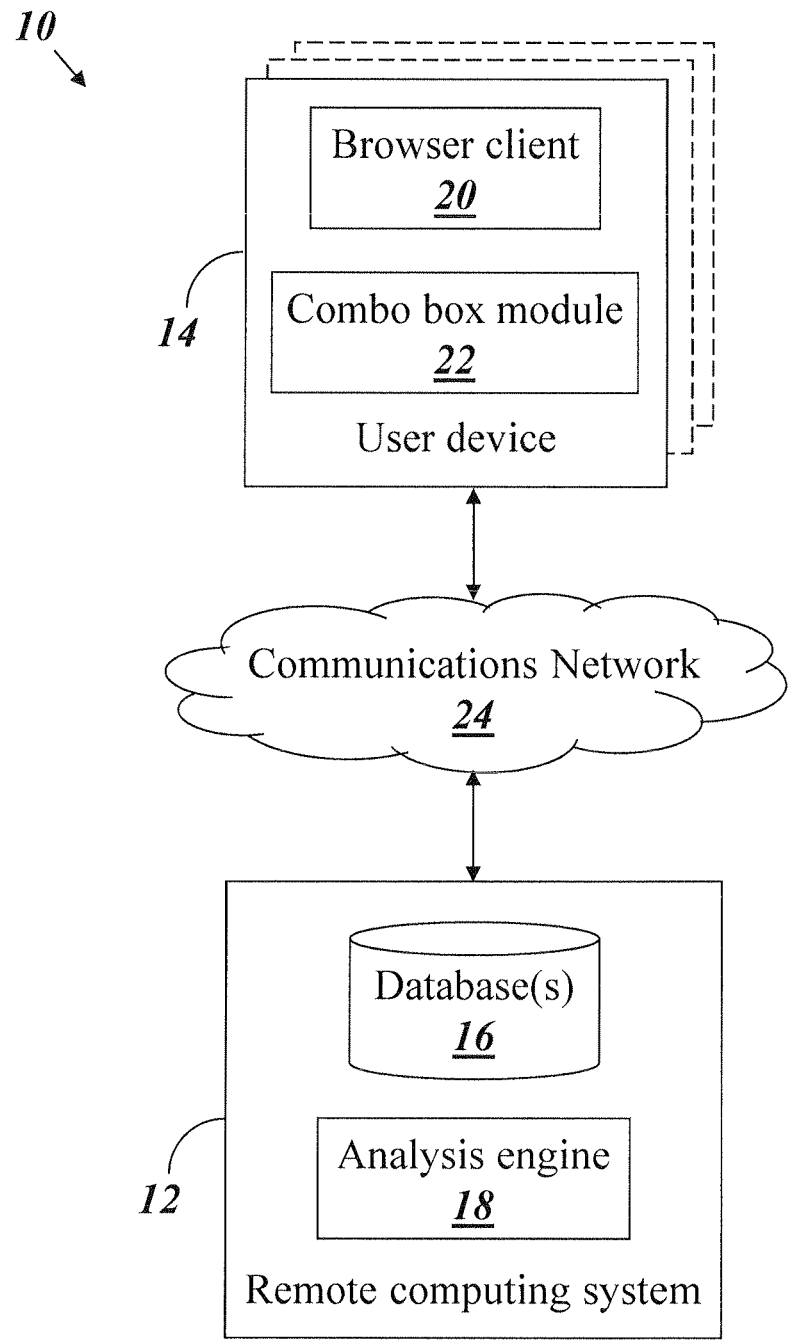
FIG. 1 is an illustrative diagram of an example embodiment of a system for performing one or more functions in accordance with the present invention.

An illustrative embodiment of the present invention relates to systems and methods for displaying input suggestions (e.g., coupon codes) on a web page that includes at least one input field for receiving a specific type of user input (e.g., at least one coupon code input field). The input suggestions (e.g., coupon codes) are displayed in a combo box. Notably, the combo box is presented in a display with the web page in such a way that the combo box covers and visually replaces the input field in the display. As such, the combo box is displayed within the user interface (UI) environment of the web page, such that it visually appears to be a UI component of the web page. In further embodiments, some or all of the input suggestions (e.g., coupon codes) displayed in the combo box are user-submitted. The input suggestions (e.g., coupon codes) can be stored in one or more databases that are updated (e.g., periodically) to remove input suggestions for particular websites determined to be invalid or unaccepted at those websites. Notably, analysis of the validity and acceptability of the input suggestions (e.g., coupon codes) in the one or more database can be "crowdsourced." For example, whenever a user operating on a user device selects and submits an input suggestion (e.g., coupon codes) from a combo box being displayed within a web page or otherwise submits (e.g., manually types in) an input suggestion (e.g., coupon code), a module on the user device can perform one or more page analyses to determine if the submission of the input suggestion (e.g., coupon codes) was successful or unsuccessful. Additionally, the page analyses may include contextual analyses of the input suggestion validity (e.g., an input suggestion may be determined to only be valid or invalid based on the current contents of a user's shopping card). This information can be aggregated at a remote computing system and analyzed further, then used to remove unreliable, invalid, or unacceptable input suggestions (e.g., coupon codes) from the one or more databases, such that they cease to be included in the combo boxes presented to users. The aggregated, analyzed information can be further used to add new input suggestions (e.g., coupon codes) to the one or more databases, such that they are included in future combo boxes presented to users.

FIGS. 1 through 10, wherein like parts are designated by like reference numerals throughout, illustrate example embodiments of systems and methods for displaying at least one input suggestion in a combo box on a web page, according to the present invention. Although the present invention will be described with reference to the example embodiments illustrated in the figures, it should be understood that many alternative forms can embody the present invention. One of skill in the art will additionally appreciate different ways to alter the parameters of the embodiments disclosed, such as the size, shape, or type of elements or materials, in a manner still in keeping with the spirit and scope of the present invention.

FIG. 1 depicts an example embodiment of a system 10 for performing the functions and methods of the present invention. The system 10 generally includes a remote computing system 12 (e.g., a toolbar server) and one or more user devices 14. The remote computing system 12 and the user devices 14 are connected via a communications network 24 (e.g., the Internet, and/or any other suitable network). The remote computing system 12 generally includes one or more databases 16 for storing information to be sent to the user devices 14 (e.g., computer readable instructions for executing methods, input suggestions for a specific type of text entry field, etc.). The remote computing system 12 additionally can include an analysis engine 18 for performing one or more analyses as described in greater detail herein. Each user device 14 generally can include a browser client 20 (e.g., a web browser) and a combo box module 22. The combo box module 22 is configured to perform various tasks based on a user's activity within the browser client 20, including, as just one non-limiting example, generating one or more combo boxes for inclusion in a display presenting a web page being accessed and viewed by a user within the browser client 20.

Combo boxes generated by the combo box module 22 generally are utilized in providing users with input suggestions for a specific type of input field (e.g., for a text entry field configured to accept only particular information). As one non-limiting and illustrative example, the input suggestion(s) can include auto-fill suggestion(s) for text entry fields configured to accept valid coupon codes. The input suggestions generally can be stored in the one or more databases 16 and transmitted from the remote computing system 12 to the user device 14. The combo box module 22 may be implemented as any suitable module, including, as some non-limiting examples, a toolbar module, an add-on module, a separate software application in communication with the browser client 20, or any other suitable module or software component, as would be appreciated by one of skill in the art upon reading the present specification.

Figure 2:
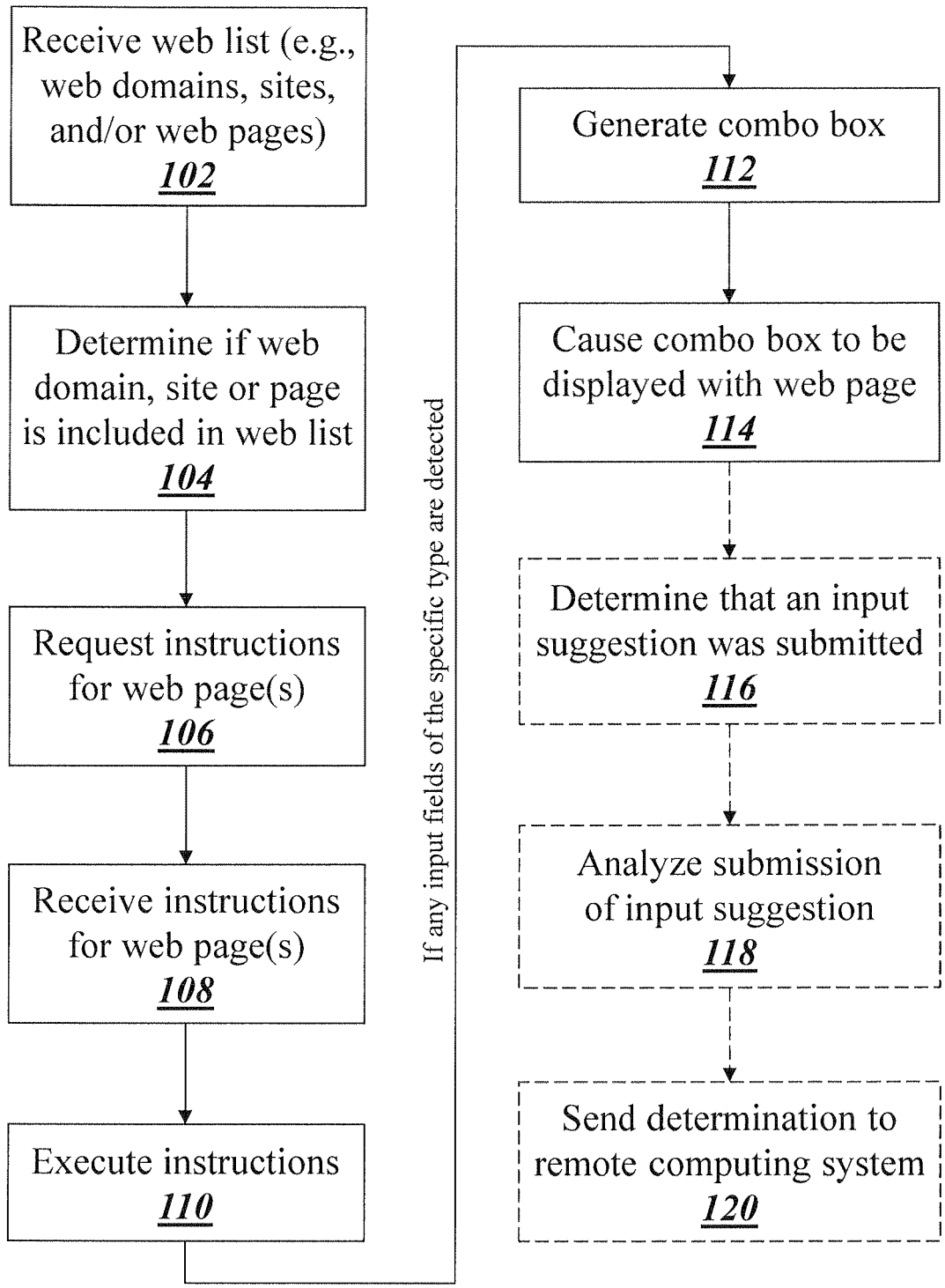
FIG. 2 is a flowchart of a method for displaying input suggestions on a web page, according to an example embodiment of the present invention.

FIG. 2 depicts a method for displaying at least one input suggestion (e.g., a coupon code) for a specific type of input field (e.g., a coupon code input field) within the user interface (UI) environment of a specific web page, according to an example embodiment of the present invention. In further embodiments where some or all of the input suggestions are user-submitted, FIG. 2 further provides an example method for "crowdsourcing" analyses of the accuracy of the user-submitted input suggestions based on whether the submissions of those suggestions are accepted by the web page to which they were submitted.

Turning now to FIG. 2, the user device 14 can receive, through at least one input device, a web list indicating one or more web domains (e.g., top-level domains, website domains, etc.), one or more websites, and/or one or more web pages for which at least one input suggestion exists (step 102). Accordingly, the web list represents at least one web page (e.g., a specified web page, a plurality of web pages associated with a particular domain, a plurality of web pages included in a particular website, etc.) for which at least one input suggestion exists. The web list can be sent to the user device 14 from the remote computing system 12, e.g., on a periodic basis, upon request from the user device 14, upon being updated, and the like. For example, the web list received by the user device 14 in step 102 can be automatically generated by the remote computing system 12 retrieving from the one or more databases 16 all web domains (e.g., website domains), websites, and/or web pages for which there is at least one entry of an input suggestion (e.g., coupon code) for a specific type of input field.

Continuing with FIG. 2, the combo box module 22 can determine if a web page, website, or web domain (e.g., website domain) that is being accessed or requested by a user is included in the web list (step 104). If the particular web page being accessed or requested is represented in some form in the web list (e.g., as a listed web page, a listed website, and/or a listed web domain), then the combo box module 22 will instruct the user device 14 to send the remote computing system 12 a request for instructions for analyzing the web page (step 106). In some embodiments, some or all of the instructions for analyzing the web page are pre-stored or built into the combo box module 22, such that the request sent in step 106 more specifically is a request for the remote computing system 12 to instruct the combo box module 22 to execute the pre-stored or built-in instructions. In situations where the combo box module 22 verifies in step 104 that a particular web domain (e.g., website domain) or website is contained in the web list (rather than a particular web page), the instructions requested by the user device 14 in step 106 can be utilized for multiple (e.g., all) web page(s) belonging to the particular verified web domain (e.g., website domain) or website. More specifically, in step 106, the combo box module 22 causes at least one processor to transmit the request through at least one output device to the remote computing system 12 via the communications network 24. The request sent in step 106 includes an identification of the particular web page, website, or web domain (e.g., website domain) being accessed or requested by the user. For example, in the case of a web page, a URL identification, such as "ebay.com," or any other suitable identification, can be included in the request. Additionally, the request sent in step 106 may include information on the "current state" of the user's interaction with the website. For example, the request may include the contents of the user's "shopping cart." Based on the request submitted to the remote computing system 12 in step 104, the user device 14 will receive, through at least one input device, a set of instructions for one or more web page(s) (step 108), e.g., the web page being accessed/requested or one or more web pages associated with the particular web domain (e.g., website domain) or the website being accessed/requested.

It should be appreciated that the term "website" includes conventional websites, as well as any other path designating a collection of one or more web pages containing that path. For instance, "example.com/buycarinsurancehere" and "example.com/buyshoeshere" are two illustrative and non-limiting examples of "websites" that could be included in the web list. One of skill in the art will appreciate yet other websites that can be included in the web list upon reading the present specification.

Figure 3:
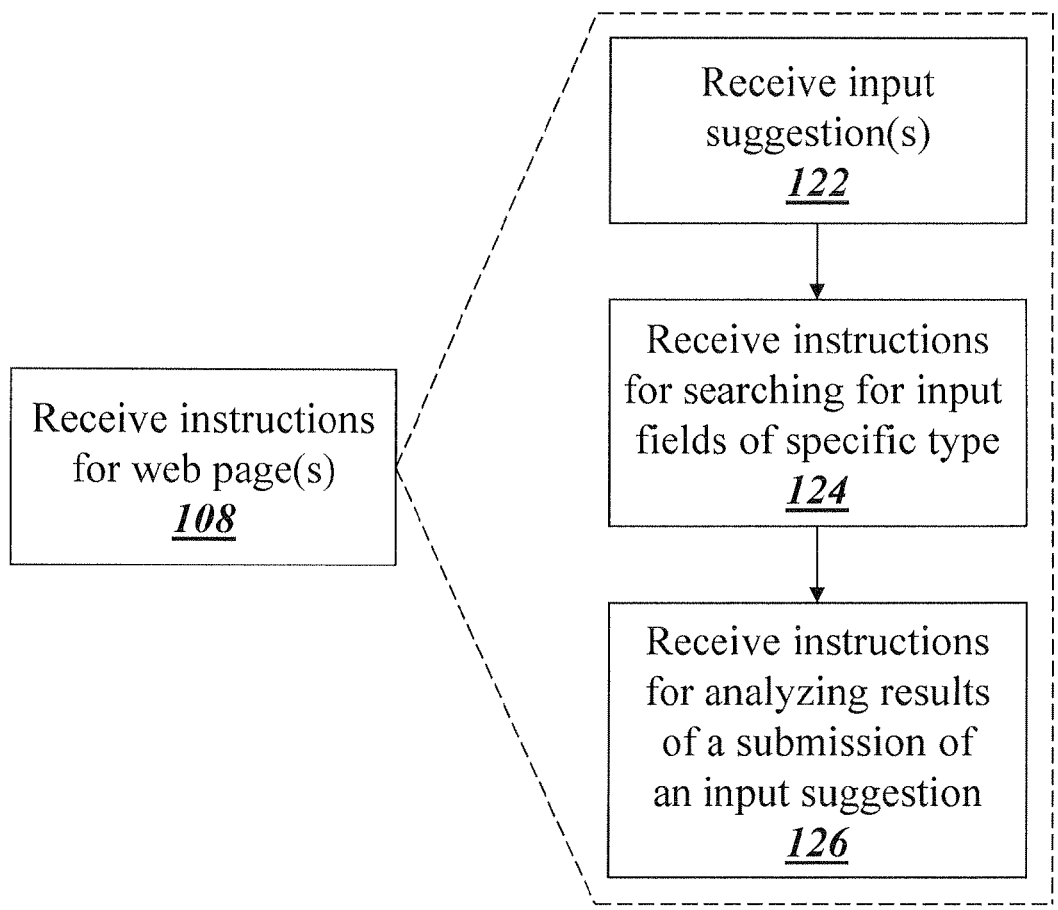
FIG. 3 is a flowchart of a method for receiving instructions for a web page, according to aspects of the present invention.

The instructions for the web page(s) that are received in step 108 can be cached or otherwise stored on the user device 14. As depicted in FIG. 3, the step 108 of receiving the one or more instructions from the remote computing system 12 can include receiving one or more input suggestion(s) for use in one or more web page(s) (step 122), receiving instructions for determining if any input fields in one or more web page(s) are of a specific type (step 124), and receiving instructions for analyzing results of a submission of an input suggestion (step 126). As an illustrative and non-limiting example, step 124 can include receiving instructions for determining if any input fields included in a web page are coupon code entry fields (e.g., as designated by accompanying text on the web page). Furthermore, the instructions that are received in step 108 may also include instructions containing information regarding how to generate combo box(es) in the event that one or more input fields are determined to be present in a web page. For example, the instructions may include information regarding where to position, how to size, and/or how to style combo boxes that are generated (e.g., position the combo box one pixel to the right of the input field and provide the combo box with a size that is five pixels wider than input field). The instructions may be specific to the particular web page and/or website being accessed and/or requested by the user, or may be general instructions.

Figure 4:
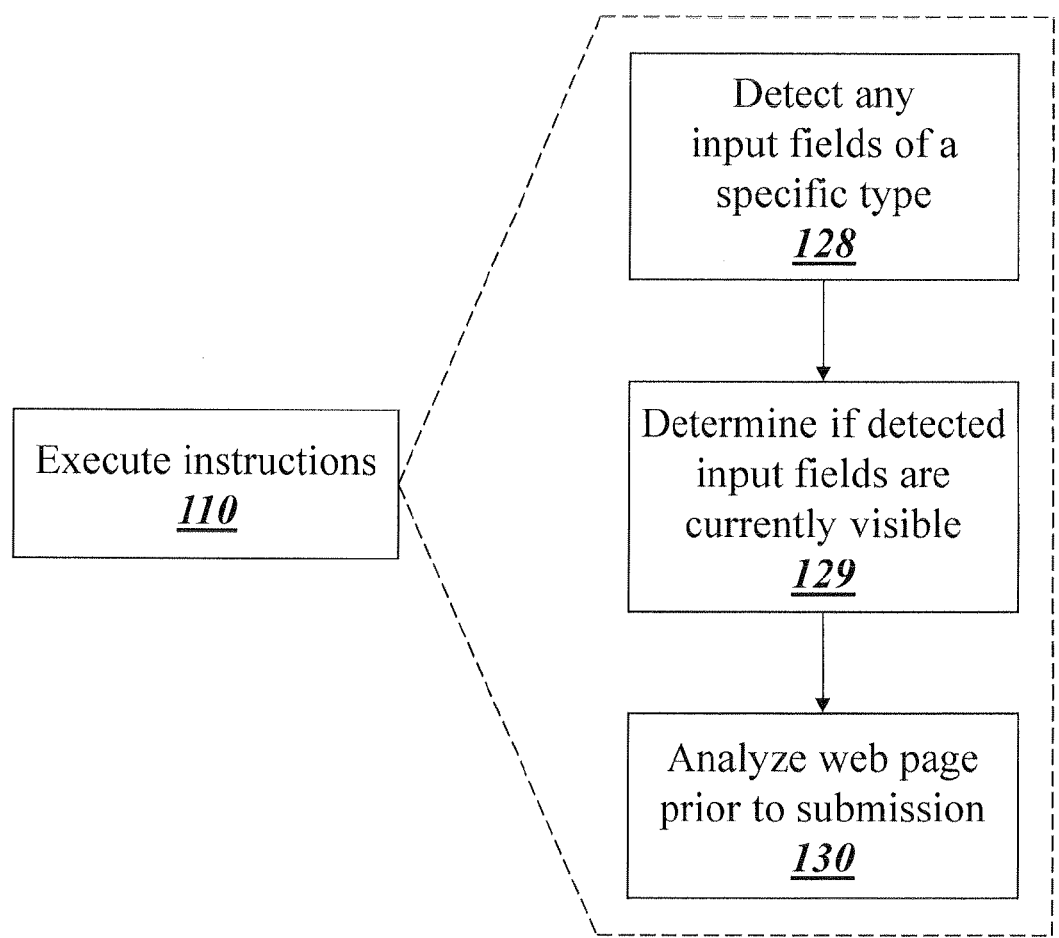
FIG. 4 is a flowchart of a method for executing instructions, according to aspects of the present invention.

Returning to FIG. 2, one or more of the received instructions can be executed on the user device 14 using at least one processor (step 110). Specifically, as depicted in FIG. 4, the step 110 of executing the received instructions can include determining if any input fields contained in a web page are of a specific type (step 128), can include determining whether any detected input fields of the specific type are currently visible (step 129) (e.g., are presently set up in the web page to be visible and/or not covered by other, overlapping elements, etc.). Step 110 of executing the received instructions additionally or alternatively can include analyzing web page(s) determined to include input field(s) of the specific type prior to a submission of information into one of the input fields (step 130). This step can be useful for a later step of determining whether a submission of an input suggestion (e.g., coupon code) was accepted by the web page, as will be described in further detail herein. In accordance with an illustrative embodiment, the step 128 of determining if any input fields contained in a web page are of a specific type is accomplished by: (a) analyzing the web page to detect the presence of any input fields configured to accept user input (e.g., in the form of text); and (b) comparing (e.g., parsing, stemming, and matching, etc.) names, identifications (IDs), and labels of any detected input fields to a list of acceptable names, IDs, and/or labels and (optionally) to a list of unacceptable names, IDs and/or labels. The list of unacceptable names and/or IDs generally can include any names and/or IDs of input fields that are believed or determined to provide a poor identification or indication of the particular type of input field for which the combo box module 22 is searching. The list of acceptable names and/or IDs generally can include any names and/or IDs of input fields that are believed or determined to provide a strong indication of the particular type of input field for which the combo box module 22 is searching. In general, the list of unacceptable names and/or IDs and the list of acceptable names and/or IDs can be pre-created lists (e.g., created manually, automatically, or both).

In particular, the list of unacceptable names, IDs, and/or labels can include subsets of names, IDs, and/or labels that match the entries in the list of acceptable names, IDs, and/or labels, but which nonetheless fail to indicate the specific type of input field being searched. For example, in some implementations, the ID "code" is included in the list of acceptable names, IDs, and/or labels, in an effort to identify input fields in web pages that are specifically designed to receive coupon codes. In such implementations, the ID "zip" can be included in the list of unacceptable names, IDs, and/or labels, so as to prevent the combo box module 22 from treating input fields with the ID "homezipcode" or "zipcode" as coupon code input fields.

As described above, in some illustrative and non-limiting example embodiments, the input suggestions are textual coupon codes (e.g., user-submitted textual coupon codes that are received by the remote computing system 12 and stored in the one or more databases 16), and the combo box module 22 is configured to determine whether any input fields in the web page(s) specifically are coupon input fields in step 128 (e.g., input fields for receiving user submissions of coupon codes, and/or which only accept valid coupon codes). In such embodiments, the list of acceptable names, IDs, and/or labels can include a different plurality of text string entries, such as "coupon," "code," "promo," and the like. The list of unacceptable names and/or IDs can include a different plurality of text string entries, such as "zip," "mail," "payment," and the like.

In some illustrative and non-limiting embodiments, the combo box module 22 preferably makes a determination in step 104 regarding a particular website being requested/accessed, rather than a single specific web page. This can be beneficial, e.g., in reducing the number of times that steps 106 and 108 are performed as a user browses (e.g., requests or accesses) multiple web pages belonging to a single website. In particular, in such illustrative and non-limiting embodiments where at least some of the instructions requested in step 106 and received in step 108 are specific to a particular website, the instructions can be repeatedly executed against each new web page belonging to the website that the user visits. For example, the instructions received in step 108 can be cached for some period of time (e.g., during the user's active browsing session of the website) such that the combo box module 22 repeatedly executes the instructions in step 110 for each newly accessed/requested web page belonging to the website. Additionally, in example embodiments implemented specifically for coupon codes, coupon code input fields commonly appear later in a user's browsing session of a particular website (e.g., in payment web pages). Thus, by caching and reusing the instructions received in step 108, it may be possible to reduce or prevent lag time between (a) a user accessing a web page and (b) a combo box finally being displayed with the web page (in step 114, as described in greater detail further herein).

Furthermore, the combo box module 22 can monitor for changes in the document object model (DOM) of a single web page over the course of the user's activity with that web page.

As would be appreciated by one of skill in the art, changes in DOM may occur as a result of user interaction with a single web page. In particular, such changes can be of the type that is produced without loading a new page and without making a web request. For example, the browser client 20 (e.g., a web browsing engine, specifically) may change the DOM to reveal and display a previously hidden input field as a result of a user clicking on selectable text stating "Click here to apply promo code." As such, the instructions received in step 108 may be executed at moments in which changes in the DOM have been detected.

Optionally, the combo box module 22 can utilize information pertaining to the input fields determined to be of the specific type in future steps (e.g., any one or more of the name, the ID, and the label).

Continuing with FIG. 4, the step 110 of executing the instructions further can include analyzing the web page prior to submission of any input suggestions (step 130). For example, step 130 can include performing page analysis (such as word frequency analysis, word link analysis, determination of the number of items in shopping cart, etc.), e.g., to generate initial page data prior to a submission of an input suggestion. This initial page data then can be compared to subsequent page data generated after submission of an input suggestion, as will be described in further detail herein.

Step 110 of executing the received instructions additionally can include analyzing the "current state" of the user interaction. This may include contents of a user's "shopping cart" (e.g., by analyzing the current page, and/or by tracking when the user adds or removing items from the cart), current total bill, shipping fees, current page user is viewing, and page(s) which referred user to the current page or site.

Returning to FIG. 2, once the combo box module 22 searches for input fields (e.g., text entry fields) of a specific type (e.g., configured to accept only certain information, such as textual coupon codes), the combo box module 22 generates a combo box for one or more input fields in the web page determined to be of the specific type (step 112). In an illustrative and non-limiting example embodiment, the combo box module 22 more specifically generates a combo box for each and every input field that is determined to be of the specific type in step 128.

Figure 5:
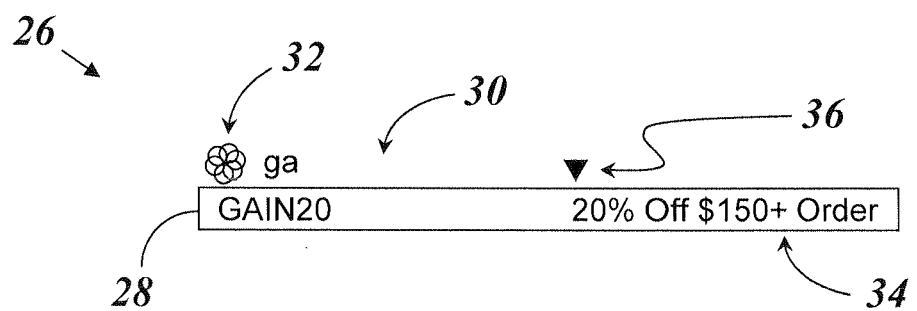
FIG. 5 is an illustrative diagram of a combo box, according to aspects of the present invention.

The combo box 26 can be any suitable combo box, as would be understood by one of skill in the art. For example, FIG. 5 depicts one such combo box 26 generated by the combo box module 22, according to an illustrative and non-limiting embodiment of the present invention. As depicted, the combo box 26 includes an input suggestion indicator 28 (e.g., a lower panel, a drop-down list/box, etc.) for presenting input suggestions (e.g., which appear as a user types, which appear based on a user clicking a drop-down button, etc.). The input suggestion indicator 28 can also present descriptive information 34 about input suggestions being presented (e.g., descriptive information about what deal is being offered through the suggested coupon code). The combo box 26 further includes a text entry field 30, depicted in FIG. 5 as white space appearing above the input suggestion indicator 28 and containing the text "ga". The combo box 26 also can include an expansion button 36 (e.g., a drop-down button) for revealing or hiding the input suggestion indicator 28. The combo box 26 additionally can include a logo 32, e.g., positioned next to the text entry field 30. In the example embodiment of FIG. 5, the text entry field 30 does not include a border. However, one of skill in the art will readily appreciate a wide variety of different ways to visually represent and present the combo box 26. All such alternatives and modifications are contemplated within the scope of the present invention. Accordingly, the example depicted in FIG. 5 is illustrative and in no way limiting to the present invention.

As shown in the example embodiment of FIG. 5, text can be entered into text entry field 30 (in this example, the letters "ga" have been entered). Based on the entered text, the combo box module 22 can retrieve one or more input suggestions for display within the input suggestion indicator 28. The input suggestions can be sent to the user device 14 from the remote computing system 12 and can be included in the instructions that are received by the user device 14 in step 108. Alternatively, the input suggestions (which are specific to the particular web page, website, or web domain being accessed/requested) can be received separate from the instructions, e.g., at a different time. For example, in one alternative embodiment, the combo box module 22 can cause the user device 14 to request input suggestions from the remote computing system 12 upon the text being entered into the text entry field 30, or upon the expansion button 36 being selected. In the example embodiment depicted in FIG. 5, the combo box module 22 retrieves one or more input suggestions (e.g., user-submitted coupon codes that match the user-entered text) and presents the retrieved input suggestions in the input suggestion indicator 28.

In an illustrative and non-limiting embodiment, the input suggestions (e.g., stored in the one or more databases 16) are specific to the particular web page, website, or web domain (e.g., website domain) being accessed or requested. For example, the input suggestions displayed in a combo box generated for a clothing company's website can be different from the input suggestions displayed in a combo box generated for an airline company's website.

The remainder of FIG. 2 will now be described with reference to the example combo box 26 of FIG. 5. However, it should be appreciated that the combo box 26 of FIG. 5 is illustrative and in no way limiting to the example method of FIG. 2 or to embodiments of the present invention.

Continuing now with FIG. 2, the combo box module 22 can use at least one processor to cause the combo box 26 generated in step 112 to be displayed with the web page (step 114). Specifically, the user device 14 outputs a display presenting both the combo box 26 and the web page to at least one presentation component on the user device 14. In illustrative embodiments, the combo box 26 is presented in such a way that the combo box 26 covers (e.g., substantially or entirely) and visually replaces the input field. Said differently, the combo box 26 is presented in a manner consistent with (e.g., visually seamless with) the user interface (UI) environment of the web page.

Figure 6:
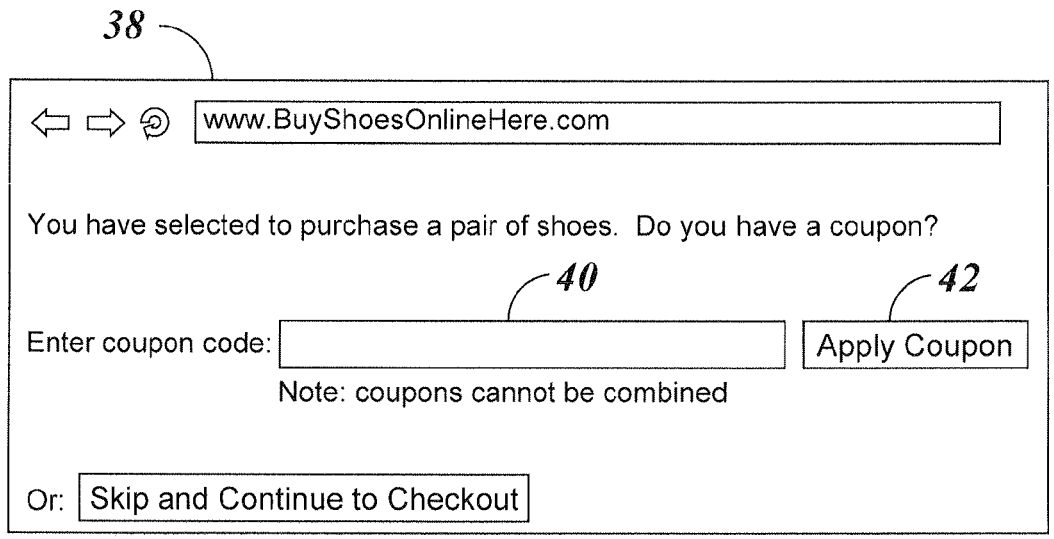
FIG. 6 is an illustrative diagram of a display containing a web page for an online shoe vender for use with embodiments of the present invention.
Figure 7:
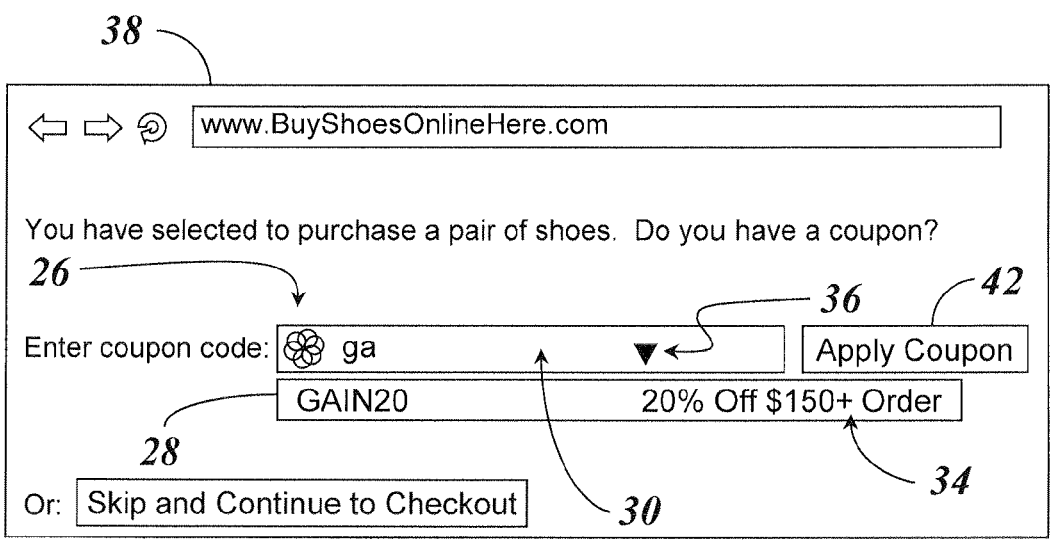
FIG. 7 is an illustrative diagram of the display of FIG. 6 further including the combo box of FIG. 5, according to aspects of the present invention.

For example, FIG. 6 depicts a display 38 containing a fictional web page for buying shoes online, located at the fictional URL, www.BuyShoesOnlineHere.com. The display 38 of the shoe-buying web page includes various content, including an input field 40 (e.g., a text entry field, in this example) for allowing users to enter textual coupon codes. The display 38 of the web page also includes a submission button 42 for allowing users to submit textual input entered into the input field 40. FIG. 7 depicts the display 38 as presented on at least one presentation component of the user device 14 as a result of step 114 of displaying the combo box 26 with the web page. As shown in FIG. 7, the input field 40 is entirely covered by the combo box 26 in the display 38, such that the combo box 26 visually replaces the input field 40 in the display 38. Said differently, in the example embodiment of FIG. 7, the combo box 26 is presented in such a way in the display 38 that it appears to be a native UI component of the web page, and such that the input field 40 is no longer visible in the display 38.

Furthermore, in accordance with some embodiments of the present invention, the combo box module 22 can be adapted to copy and display information that is encoded in the input field 40 (i.e., information pertaining to the presentation of the input field 40) for use in generating the combo box module 22. For example, combo box module 22 can be configured to generate combo boxes 26 that copy font, background, border, color, size, or style information (or any combination thereof) of the input fields 40 being visually replaced. For example, in a first such illustrative embodiment, this information is transferred from Cascading Style Sheets format (CSS, as would be appreciated by one of skill in the art) into the native format of the combo box renderer. In a second such illustrative embodiment, combo boxes 26 can be rendered using the web browser engine of the browser client 20, which can be instructed to directly copy the CSS into the combo box 26. Using this form of direct copying, combo boxes 26 can be generated to be visually identical to the input field 40 (e.g., with the exception of deliberate changes such as the expansion button 36, the logo 32, etc.). This is by virtue of the fact that in such embodiments, the combo box 26 is rendered using the same engine with the same styles.

Alternatively to copying, transferring, or otherwise utilizing the CSS information, the combo box module 22 can be adapted to cause a screenshot to be taken of the input field 40. The screenshot then can be used as a background to combo box 26, e.g., to provide that the combo box 26 is identical or substantially identical to the input field 40. In accordance with yet further aspects of the present invention, the positioning of any elements within the combo box 26 may be adjusted based on image analysis of the screenshot, e.g., using a standard "edge-finding" algorithm to determine the intended visual location and size of the input field 40. Such features can enable determination of the position and size of the input field 40, specifically as viewed by the human eye.

In accordance with some embodiments of the present invention, the text entry field 30 may be omitted entirely, in such a way that the combo box 26 does not include the text entry field 30. This effect may alternatively be achieved by blocking the visibility and interaction capabilities of the text entry field 30, e.g., through the use of "regions" (as would be appreciated by one of skill of the art) or any other suitable mechanism for generating "holes" in a display element. In such embodiments where the text entry field 30 is either disabled within or absent from the combo box 26, the input field 40 can remain visible to the user, and user input can be entered directly into the input field 40 of the web page. In such embodiments, the combo box module 22 can be configured to monitor the input field 40 for input and display input suggestions based on user input into the input field 40. In addition, the input suggestion indicator 28 can be adapted to appear on the display 38 in response to user input. For example, when a user strikes the keys of a keyboard or other suitable input device, the input suggestion indicator 28 can appear on the display 38 and a first input suggestion can be presented based on the currently entered keys. For example, once a user types "ga," the input suggestion indicator 28 can be appear, and the first input suggestion can be "GAIN20." Similarly, when the user clicks on input field 40, the input suggestion indicator 28 can appear. Optionally, any text to the right of the cursor can be highlighted to indicate that it has not been inputted by the user, as would be appreciated by one of skill in the art. Similarly, the combo box module 22 can be adapted to detect input from the up and down arrow keys (and/or page up, page down keys). In response to such up/down commands, the combo box module 22 can be adapted to change the currently selected input suggestion and set the text in the input suggestion indicator 28 to match the currently selected input suggestion. Similarly, the user can be permitted to click on various input suggestions being displayed, which would then be copied into the text input field 40. Upon reading the present specification, one of skill in the art will appreciate a wide variety of alternatives and modifications that can be made to the manner in which the input suggestions are displayed. All such alternatives and modifications are contemplated within the scope of the present invention. In general, any suitable displays for presenting users with input suggestions and for allowing users to navigate and/or select input suggestions are included within the scope of the present invention.

In general, after completing step 114 of causing the combo box to be displayed with the web page, the user operating the user device 14 and viewing the display 38 presenting the web page is able to enter text into the combo box 26. In illustrative embodiments according to the present invention, the combo box module 22 is configured to replicate in the input field 40 of the web page all input actions performed by a user in the combo box 26 (e.g., entry of text into the combo box 26, deletion of text from the combo box 26, etc.). In this manner, any text entered by the user into the combo box 26 for submission through the web page is duplicated in the input field 40 of the web page. "Duplicate," as used herein, means "to generate a perfect copy of." As such, in illustrative embodiments, text entered by the user into any combo box 26 generated in step 112 and displayed in step 114 exists in two distinct places: (a) the text entry field 30 of the combo box 26, and (b) the input field 40 of the web page. However, any duplicate text in the input field 40 of the web page is not visible to the user on the display 38, since the input field 40 is covered by and visually replaced by the combo box 26.

As depicted in FIG. 7, in illustrative embodiments of the present invention, the submission button 42 for submitting input entered into the input field 40 remains visible and uncovered by the combo box 26 in the display 38. As such, users are enabled to click (or otherwise select) the submission button and thereby submit any duplicate text generated by the combo box module 22 to the web server (e.g., the "Buy Shoes Online Here" web server in the example of FIG. 7) hosting the web page included in the display 38. Accordingly, in this manner, the combo box 26 enables users viewing web pages that contain specific types of input fields to view, select, and submit input suggestions stored in the one or more databases 16. Notably, all of this can be performed by the user in the display 38 and the UI environment of the web page presented in the display 38. Optionally, if the user hits the "enter" key on his or her keyboard while the text entry field 30 is selected/highlighted, the combo box module 22 can instruct the browser client 20 to simulate an enter key-press on the input field 40 of the web page.

It should be noted that in illustrative embodiments of the present invention, the combo box module 22 does not cause input suggestions displayed in the combo box 26 and selected by the user to be sent to the web server hosting the web page. Rather, it is the browser client 20 that causes the input suggestions selected by the user to be sent to the web server hosting the web page.

Figure 8:
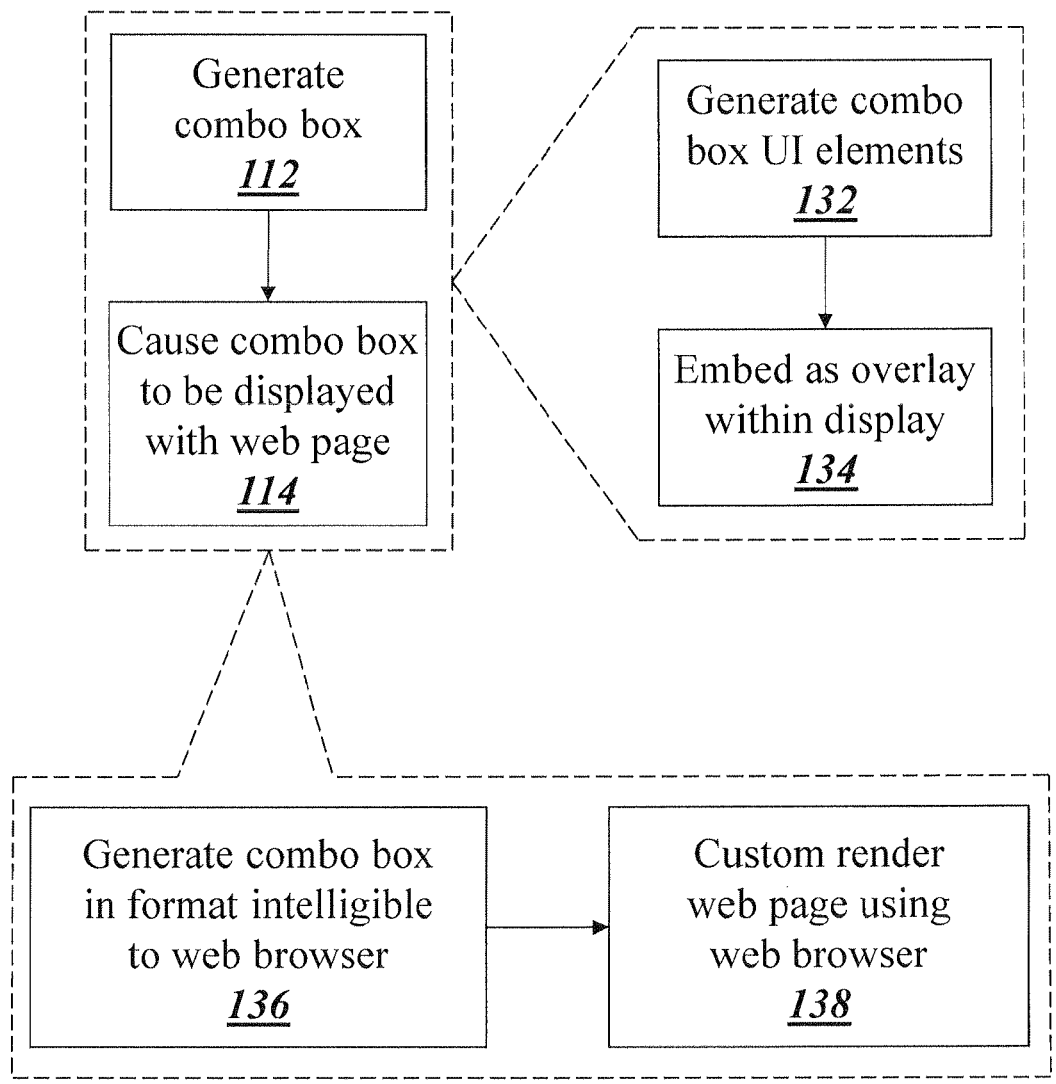
FIG. 8 is a flowchart of a method for generating a combo box and a step of presenting the combo box in a display with a web page, according to aspects of the present invention.

The step 112 of generating the combo box 26 and the step 114 of presenting the combo box 26 in the display 38 with the web page can be performed in a number of different ways. For example, FIG. 8 depicts two illustrative and non-limiting ways to implement steps 112 and 114. The combo box 26 can be generated in step 112 as one or more UI elements (step 132) that are independent of the browser client document object model (DOM) being used to render the web page in the display 38. For example, the combo box 26 can be generated in step 112 in a format that is not intelligible to the browser client DOM. The combo box 26 then can be presented in step 114 as an overlay component in the display 38 (step 134), positioned at the same coordinates of the input field 40. For example, the combo box 26 can be rendered and caused to be presented in the display 38 by a separate application that is independent from the browser client 20, or by an extension of the browser client 20.

Alternatively, the combo box 26 can be generated by the combo box module 22 initially in a format (e.g., a combination of a markup language such as html, xml, image files, etc. and formatting information in CSS, XSL, etc.) that is intelligible to a web browser engine (e.g., layout engine, rendering engine, etc.) of the browser client 20 (step 136). For example, the initial format of the combo box 26 can be "injected" into the DOM of the web page in such a way that the web browser engine renders the web page to include the combo box 26 at the same coordinates of the input field 40 (step 138). In such embodiments, the input field 40 can be present in the display 38, but be visually replaced and covered by the combo box 26. Alternatively, combo box module 22 can instruct the browser client 20 to delete the input field 40 from the web page DOM, such that only the combo box 26 (and not the input field 40) is included in the display 38. Alternatively, the combo box module 22 can instruct the browser client 20 to display the suggestion indicator 28 when the user interacts with input field 40, and/or can instruct the browser client 20 to highlight input field 40.

Those skilled in the art will appreciate that in some embodiments utilizing steps 136 and 138, some web browsers may not support combo boxes. In such circumstances, and for such embodiments utilizing steps 136 and 138, the combo box module 22 can create a substitute combo box structure (e.g., a drop-down box which populates the input field 40) that is also injected into the DOM of the web page loaded by the browser client 20 in step 136. As yet another possibility, the combo box module 22 can be adapted to create the combo box 26 as a new field in a format provided by a plug-in (e.g., Adobe Flash sold by Adobe Systems headquartered in San Jose, Calif., or another standard or commonly used plug-in). The combo box 26 created in the standard format of the plug-in then can be injected into the DOM of the web page loaded by the browser client 20 in step 136. In such instances, the combo box module 22 can be adapted to generate the combo box 26 in the standard plug-in format in such a way that the combo box 26 is configured to replicate, in the input field 40 of the web page, all input actions performed by a user in the combo box 26 (e.g., entry of text into the new field, deletion of text from the new field, etc.).

In accordance with some alternative embodiments, rather than inject content into the DOM of the web page, the page markup code itself can be directly replaced (e.g., with a modified version) before being evaluated by the web browser engine of the user device 14. Such a replacement (e.g., and modification) may be performed by the web browsing engine itself, or may be performed by a web proxy server running either on the user device 14 or on the remote computing system 12. Accordingly, in embodiments where a web proxy server running on the remote computing system 12 replaces the page markup code of a web page with, e.g., a modified page markup code containing one or more combo boxes, it should be understood that the combo box module 22 may be implemented in such a way that it is located in part or entirely on the remote computing system 12. Stated differently, the remote computing system 12 (e.g., one or more web proxy servers included therein, in particular) can be adapted to perform some or all of the functions of the combo box module 22 described herein. For example, a web proxy server included in the remote computing system 12 can analyze web traffic to and from the user device 14 and creating changes in the page markup code of a web page sufficient to cause a combo box 26 to be included in the resulting display 38 on the user device 14. In this way, step 128 of searching for input fields of a specific type can be performed by the remote computing system 12 viewing and analyzing the web content being sent to the user device 14. Furthermore, in such embodiments wherein the combo box module 22 is implemented on the remote computing system 12, the step 104 of determining if a web domain, web site, or web page is included in the web list can be performed by the web proxy server running on the remote computing system 12, e.g., on a request-by-request basis as web requests are received by the web proxy server(s) of the remote computing system 12.

In general, the input suggestions (e.g., coupon codes) utilized in the method of FIG. 2 can be user-submitted input suggestions (e.g., coupon codes). For example, in such embodiments where the input suggestions are coupon codes, the remote computing system 12 can include one or more web servers hosting one or more coupon code submission web pages that allow users to submit coupon codes for any of a variety of different companies, websites, etc. In such embodiments, the remote computing system 12 can receive user submissions of coupon codes, store the user-submitted coupon codes in the one or more database 16, and subsequently send the user-submitted coupon codes as input suggestions to the user devices 14 as described above with reference to FIG. 2.

In some further embodiments according to the present invention, the remote computing system 12 is configured in such a way that the remote computing system 12 automatically updates (e.g., on a periodic bases, on a continuous basis, on an as-needed basis, in real-time, etc.) the plurality of user-submitted input suggestions (e.g., user-submitted coupon codes) in the one or more databases 16 based upon analysis of whether user submissions of selected input suggestions (e.g., selected coupon codes) were successful. Thus, continuing with FIG. 2, if a user selects and submits one of the input suggestions (e.g., selects and submits a user-submitted coupon code) presented in the combo box 26, then the combo box module 22 determines that an input suggestion was submitted (step 116). This can be achieved by performing a subsequent text analysis of the new web page that is displayed after the submission of the input suggestion, as would be appreciated by one of skill in the art. It should be noted that the new web page displayed after the submission of the input suggestion may be an entirely new web page or may be a modified version of the initial web page (e.g., the web page depicted in the display 38 of FIG. 6). In general, the determination of step 116 can be made by analyzing any subsequent document capable of indicating that a submission has occurred, was attempted, was successful, etc.

As just one illustrative and non-limiting example, step 116 can be based on the combo box module 22 determining any one or more of the following: (a) that an input field determined to be of the specific type in step 128 was subsequently replaced in the new or modified web page by a hidden field having the same identity (e.g., identical name, ID, and/or label) as the input field determined to be of the specific type; (b) that, following entry by a user of text into the combo box 26, both http traffic was detected and the browser client document object model (DOM) for the web page was modified, in rapid succession; (c) that an input field determined to be of the specific type in step 128 was subsequently presented in a new page loaded by the user; or (d) that one or more rules specific to the particular web page, website, or web domain (e.g., website domain) being accessed (e.g., site-specific text searches) were satisfied.

If it is determined in step 116 that an input suggestion (e.g., coupon code) was in fact submitted, then the combo box module 22 can analyze the submission of the input suggestion (step 118), e.g., to gather data pertaining to whether the submission was successful. In illustrative embodiments, this includes comparing the subsequent web page indicating that the submission occurred to the initial web page displayed prior to the submission of the input suggestion (e.g., coupon code). For example, the combo box module 22 can cause at least one processor to perform one or more subsequent page analyses (such as word frequency analysis, word link analysis, analysis of shopping cart contents, etc.) on the subsequent web page, and can thereby generate subsequent page data for comparison to the initial text data generated in step 130. For example, the page analyses can include determining any one or more of the following: (a) the number of occurrences of strings such as "fail," "try again," "sorry," "successfully submitted," "confirmed," etc.; (b) the total number and identity of items in the shopping cart; (c) the total bill owed by the customer; and the like. For example, an increase in number of occurrences of the word "fail" can indicate that a submission was unsuccessful, etc. The initial and subsequent page analysis also can include determining if any input fields present on the initial web page remained (and if so, analyzing their names/IDs), if any input fields on the initial web page were replaced (and if so, analyzing the names/IDs of the new/replacement input fields), etc. Upon reading the present specification, one of skill in the art will readily appreciate a wide variety of ways to determine if a submission of an input suggestion was successful, e.g., based on initial and subsequent page analysis. All such alternatives and modifications are contemplated within the scope of the present invention. Additionally, step 118 can include analysis of the input submission to determine why the input submission was successful or unsuccessful. For example, the page analyses can include checking the contents of strings such as, "coupon requires . . . " or "ineligible because . . . ", checking the "current state" of the user interaction, etc.

The results of the analysis of step 118 can be sent to the remote computing system 12 (step 120) for further data processing and analyzing (e.g., comparisons). For example, in some illustrative and non-limiting embodiments, the remote computing system 12 aggregates the results from many different user submissions of many different input suggestions (e.g., coupon codes) in many different web pages and analyzes the aggregate results to use in updating the one or more databases 16.

Figure 9:
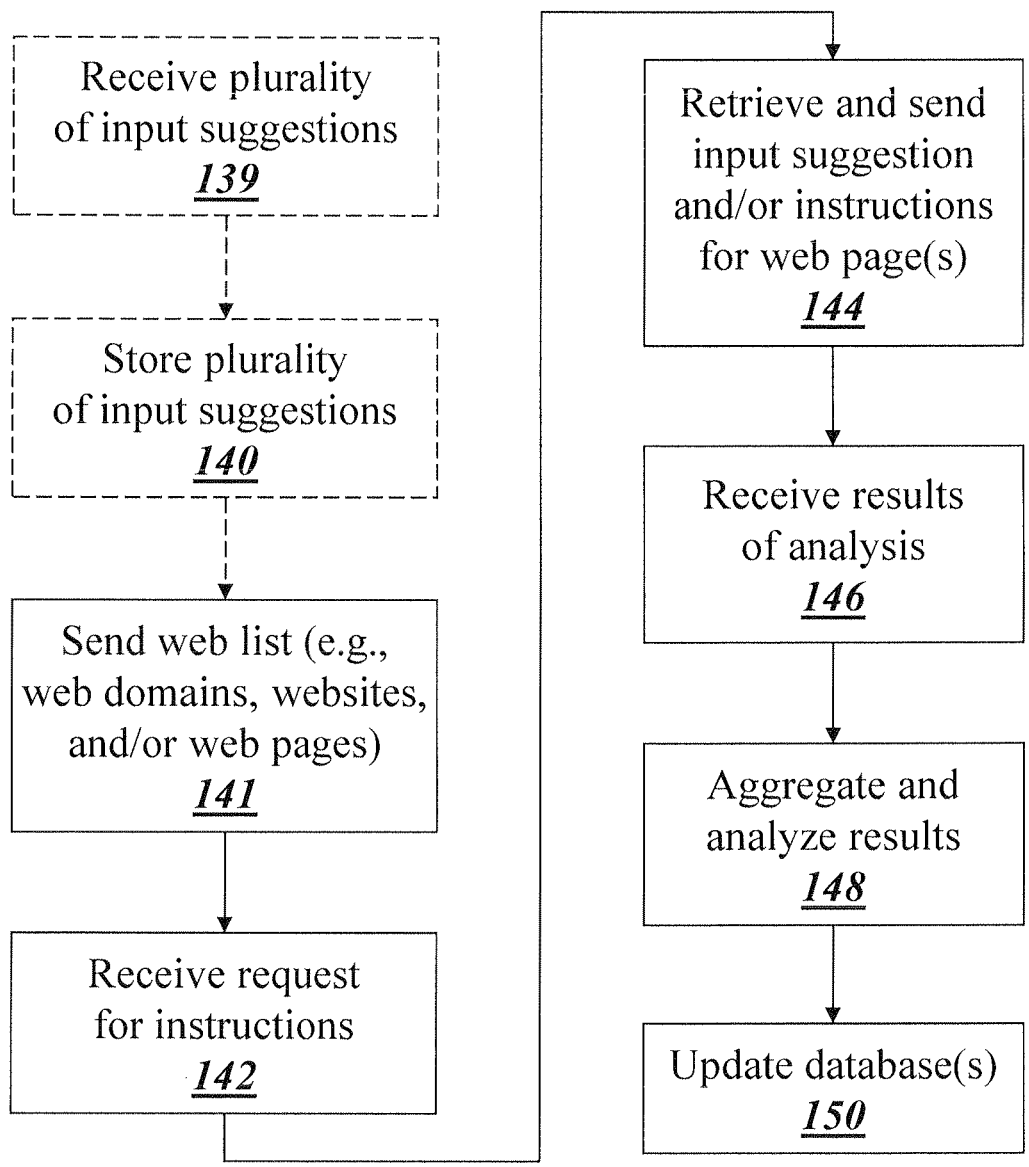
FIG. 9 is a flowchart of a method for providing instructions for use in the steps shown FIG. 2, according to aspects of the present invention.

FIG. 9 depicts an example method executed by the remote computing system 12 based upon the various steps performed by the user device 14 in FIG. 2. Stated in terms of a client-server framework for the system 10, FIG. 2 generally can represent actions occurring on the client side (e.g., the user device 14), and FIG. 9 generally can represent actions occurring on the server side (e.g., the remote computing system 12).

Turning now to FIG. 9, the remote computing system 12 optionally can receive a plurality of input suggestions (step 139). For example, in embodiments where the input suggestions (e.g., coupon codes) are user-submitted, step 139 can include receiving from a plurality of users the plurality of input suggestions. In some embodiments, if a user submits input (e.g., a coupon code) into the combo box 26 that is not already represented as an input suggestion (e.g., coupon code) in the one or more databases 16, then the remote computing system 12 can update the one or more databases 16 to include the user input submitted to the web page subsequent to step 114. In this manner, the combo box 26 generated in step 112 can be utilized not only for presenting stored or known input suggestions (e.g., coupon codes), but also for collecting new or unknown input suggestions (e.g., coupon codes) from users. Alternatively or additionally to receiving user submissions of coupons, aggregation websites that collect input suggestions (e.g., coupon code) can be mined by the remote computing system 12 and received in step 139. The input suggestions received in step 139 can be stored, e.g., in the one or more databases 16 (step 140).

Continuing with FIG. 9, the remote computing system 12 can transmit, through at least one output device, the web list containing one or more of a web domain (e.g., a website domain), a website, or a web page for which at least one input suggestion exists, e.g., in the one or more databases 16 (step 141). This step can be performed periodically, continuously, in response to a request from the user device 14, on an as-needed basis (for example, as new entries for input suggestions are added to the one or more databases 16), etc. In response to step 106 of the user device 14 sending a request for instructions for a web page, website, or web domain (e.g., website domain) that the browser client 20 has accessed or requested, the remote computing system 12 can receive the request for instructions for the web page, website, or web domain (e.g., website domain) (step 142). Based on the received request, the remote computing system 12 retrieves from the one or more databases 16 and transmits, through at least one output device, one or more of the input suggestions (e.g., coupon codes) and instructions for the requested web page, website, or web domain (e.g., website domain). For example, the input suggestions and instructions can be retrieved from the one or more databases 16 by querying the one or more databases 16 based on the identification of the web page, website, or web domain (e.g., website domain) that is contained in the request received in step 142. As examples, the remote computing system 12 can send any one or more of (a) at least one input suggestion pertaining to the web page, website, or web domain (e.g., website domain), (b) instructions for searching for input fields of a specific type, or (c) instructions for analyzing results of a submission of an input suggestion.

Following a submission of an input suggestion by a user into a web page, the remote computing system receives the results of the analysis performed in step 118 from the user device 14 (step 146). As the remote computing system 12 receives a plurality of such results (e.g., from a plurality of different users and including multiple such results for the same input suggestions based on multiple different attempts to submit the same input suggestions), the analysis engine 18 of the remote computing system 12 can aggregate and analyze the plurality of results (step 148). Based on the analysis in step 148, the remote computing system 12 can update the one or more databases 16 (step 150). In some example embodiments, any input suggestions that are determined in step 148 to meet one or more criteria (e.g., exhibiting less than a minimum required threshold rate of acceptance by a web page, website, or web domain (e.g., website domain), failing to be accepted by a particular web page, website, or web domain a predetermined number of consecutive times) are removed from the one or more databases 16 as an input suggestion for the particular web page, website, or web domain (e.g., website domain). For example, input suggestions that are determined in step 148 to meet one or more criteria for removal can be deleted from the one or more databases 16, can be moved to one or more other databases or data stores included in the remote computing system 12 (e.g., an "unaccepted input suggestions" repository), or can be otherwise removed from the one or more databases 16. Furthermore, the results of the analysis received in step 148 can include results obtained from user attempts to submit input suggestions that are not stored in the one or more databases 16. In such instances, step 150 of updating the one or more databases 16 can include adding the new input suggestions to the one or more databases 16 (e.g., if the new input suggestions are determined to be valid, etc.).

Additionally, the analysis in step 148 may include analyzing information about the "current state" of the user interaction at the time of the input suggestion. In some example embodiments, any inputs suggestions that are determined in step 148 to meet one or more criteria (e.g., being frequently, with some threshold, valid if and only if a specific item is in the user's shopping cart) can have this criteria added to one or more databases 16. In such instances, step 150 of updating the one or more databases 16 can include adding constraints to the one or more databases (e.g., if a new input suggestion is determined to be only conditionally valid).

As described herein, the steps depicted in FIGS. 2 and 9 generally are performed or caused to be performed on/by the user device 14 and the remote computing system 12, respectively. However, one of skill in the art will appreciate upon reading the present specification that various of the steps depicted in FIGS. 2 and 9 alternatively may be performed or caused to be performed on/by the remote computing system 12 and the user device 14, respectively. As just some illustrative and non-limiting examples, in some embodiments, some or all of the web list received in step 102 or the instructions received in step 108 can be stored on the user device 14 rather than being transmitted to the user device 14 from the remote computing system 12 across the communications network 24. Similarly, in some embodiments, the analysis performed in step 116 to determine that an input suggestion was submitted and/or in step 118 to determine if the submission was successful is instead performed by the analysis engine 18 on the remote computing system 12. Similarly, some or all of the analysis performed in step 148 can be performed on the user device 14 (e.g., by the combo box module 22) rather than being performed by the analysis engine 18 on the remote computing system 12. One of skill in the art will appreciate yet other ways to modify the manner in which the methods and steps described herein are executed upon reading the present specification. All such modifications and alternatives are contemplated within the scope of the present invention.

In general, any suitable computing device can implement the system 10 and the methods described herein, as would be appreciated by one of skill in the art. For) example, the computing device can include one or more server devices, e.g., logically coupled and in communication with each other. As such, the components (e.g., the modules, engines, etc.) of FIG. 1 generally can be implemented as executable instructions contained in one or more non-transitory computer readable storage devices included in the computing device, one or more input devices, one or more output devices, etc., as would be appreciated by one of skill in the art.

Figure 10:
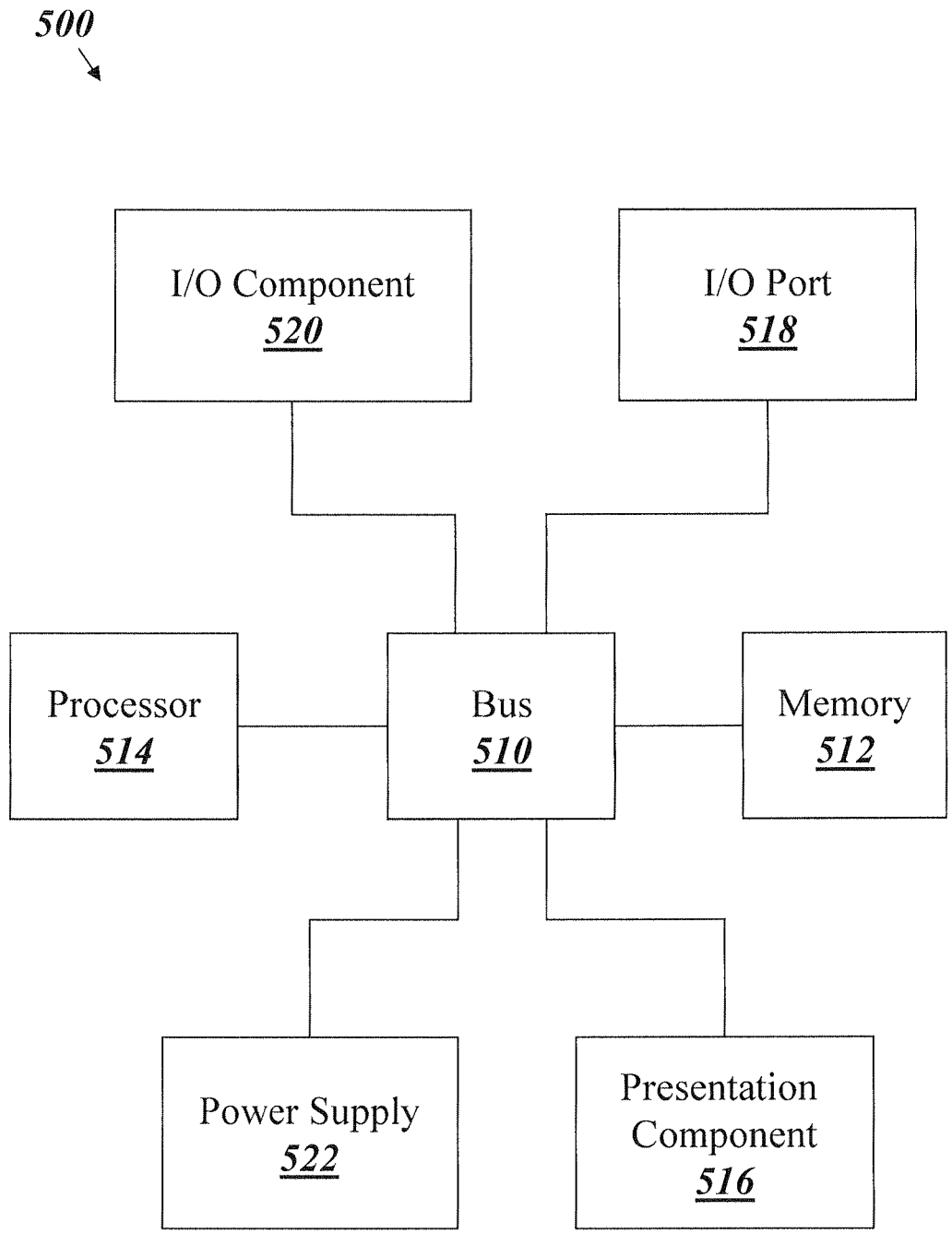
FIG. 10 is an example computing device for implementing the system of FIG. 1, according to aspects of the present invention.

FIG. 10 illustrates an example of a computing device 500 for implementing illustrative methods and systems of the present invention. The computing device 500 is merely an illustrative example of a suitable computing environment and in no way limits the scope of the present invention. A "computing device," as represented by FIG. 10, can include a "workstation," a "server," a "laptop," a "desktop," a "hand-held device," a "mobile device," a "tablet computer," or other computing devices, as would be understood by those of skill in the art. Given that the computing device 500 is depicted for illustrative purposes, embodiments of the present invention may utilize any number of computing devices 500 in any number of different ways to implement a single embodiment of the present invention. Accordingly, embodiments of the present invention are not limited to a single computing device 500, as would be appreciated by one with skill in the art, nor are they limited to a single type of implementation or configuration of the example computing device 500.

The computing device 500 can include a bus 510 that can be coupled to one or more of the following illustrative components, directly or indirectly: a memory 512, one or more processors 514, one or more presentation components 516, input/output ports 518, input/output components 520, and a power supply 522. One of skill in the art will appreciate that the bus 510 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 10 is merely illustrative of an exemplary computing device that can be used to implement one or more embodiments of the present invention, and in no way limits the invention.

The computing device 500 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 500.

The memory 512 can include computer-storage media in the form of volatile and/or nonvolatile memory. The memory 512 may be removable, non-removable, or any combination thereof. Exemplary hardware devices are devices such as hard drives, solid-state memory, optical-disc drives, and the like. The computing device 500 can include one or more processors that read data from components such as the memory 512, the various I/O components 520, etc. Presentation component(s) 516 present data indications to a user or other device. Exemplary presentation components include a display device, speaker, printing component, vibrating component, etc.

The I/O ports 518 can allow the computing device 500 to be logically coupled to other devices, such as I/O components 520. Some of the I/O components 520 can be built into the computing device 500. Examples of such I/O components 520 include a microphone, joystick, recording device, game pad, satellite dish, scanner, printer, wireless device, networking device, and the like.

One of skill in the art will appreciate a wide variety of ways to modify and alter the system 10 of FIG. 1, as well as the various components with which it interacts. For example, the one or more databases 16 can be implemented according to any number of suitable database structures. Furthermore, some or all of the information contained in the one or more databases 16 alternatively can be stored in one or more remote databases (e.g., cloud databases, virtual databases, and any other database remote to the remote computing system 12). Additionally, although the components of FIG. 1 are depicted as discrete blocks and elements, in fact the system 10 may be implemented in such a way that multiple of the depicted modules, engines, or other components are implemented with just a single module, engine, or component. Similarly, in some embodiments it may be desirable to implement the system 10 or its constituent parts using multiple iterations of the depicted modules, engines, and/or other components, as would be appreciated by one of skill in the art. Furthermore, while some modules and components are depicted as included within the system 10, it should be understood that, in fact, any of the depicted modules alternatively can be excluded from the system 10 and included in a different system. One of skill in the art will appreciate a variety of other ways to expand, reduce, or otherwise modify the system 10 and/or its constituent parts upon reading the present specification.

In accordance with some further embodiments of the present invention, the combo box module 22 additionally can enable creation of the instructions received in step 124 to be "crowdsourced" among users utilizing the combo box module 22 at their respective user devices 14. Specifically, the combo box module 22 can provide users an opportunity to indicate that a combo box 26 being displayed is positioned over an incorrect input field. For example, the combo box module 22 can include additional instructions that, when executed by at least one processor, generate one or more user interface (UI) elements that present a selectable indicator (e.g., a clickable button). The users use the selectable indicator (e.g., clickable button) to indicate that a combo box 26 is incorrectly placed by (a) selecting a correct input field over which the combo box 26 should be placed, and (b) selecting the selectable indicator (e.g., clickable button) to submit an indication to the remote computing system 12 of a perceived correct input field in the web page over which the combo box 26 should have been placed. The remote computing system 12 can aggregate such indications from a plurality of different users for individual web pages, websites, or web domains (e.g., website domains). The analysis engine 18 then can cause one or more processors to analyze the aggregated indications and determine one or more correct locations to be specified in the instructions indicating which input fields of a web page to visually replace with the combo box 26.

Certain example embodiments of the present invention described herein refer to illustrative implementation for coupon codes. It should be noted that "coupon code," as used herein, generally encompasses any code for providing a promotional deal; a price discount; a voucher; or access to any other product, service, or fee that is otherwise not available without the coupon code (e.g., any other form of limited accessibility product, service, or pricing). Furthermore, it should be appreciated that embodiments of the present invention are in no way limited to such illustrative embodiments implemented for coupon codes. Rather, the input suggestions can be adapted for any other suitable form of content (e.g., any other form of user-submitted content), as would be appreciated by one of skill in the art. Furthermore, the specific type of input fields in web pages that are replaced by the combo boxes 26 can be adapted for any other specific type of input field, as would be appreciated by one of skill in the art upon reading the present specification.

Embodiments of the present invention can enable a variety of benefits. For example, when utilizing the illustrative systems and methods provided herein, users can access a plurality of user-submitted input suggestions (e.g., coupon codes) seamlessly within the UI environment of the very web pages where the input suggestions are intended for use and submission. Accordingly, in the illustrative implementation for coupon codes, users can more readily gain access to deals, discounted rates, special products or services, and the like, simply by navigating to a web page where a purchase can be made, selecting a suggested coupon code from the combo box 26, and submitting the coupon code to the web page. One of skill in the art will appreciate that this represents significant improvement over existing systems, which instead require users to manually search a third-party coupon aggregation site for the particular desired coupon codes, then copy-and-paste the desired coupon code from the third-party site into the particular website for which the coupon code is intended to be used.

In addition to simplifying and streamlining the process for discovering input suggestions, embodiments of the present invention can provide similar benefits to the process of submitting new input suggestions to the remote computing system 12. For example, through the illustrative systems and methods provided herein, users are enabled to submit new input suggestions (e.g., coupon codes) to the remote computing system 12 simply by entering the new input suggestion (e.g., coupon code) into the combo box 26. Thus, example embodiments of the present invention described herein can enable users to provide new submissions of input suggestions (e.g., coupon codes) to the remote computing system 12 seamlessly within the UI environment of the very web pages where the input suggestions are intended for use and submission.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A computer implemented method for displaying input suggestions stored on a remote computing system for entry into a specific type of input field, the method comprising:
   sending, through an output device and to a user device, at least one input suggestion for entry into a specific type of input field, the at least one input suggestion being stored on the remote computing system;
   upon the user device requesting or accessing a web page, determining using at least one processor that an input field in the web page is of the specific type;
   based on the step of determining that the input field in the web page is of the specific type, generating using at least one processor, a combo box for presenting the at least one input suggestion by copying or utilizing information pertaining to the presentation of the input field in the web page and causing the combo box to be included in a display with the web page in such a way that the combo box visually replaces the input field in the display; and wherein the combo box is rendered by a web browser engine and the information is copied by the web browser engine into the combo box;

wherein user input in the combo box is enabled to be submitted through the web page.

2. The computer implemented method of claim 1, wherein the step of determining whether any input fields in the web page are of the specific type comprises executing one or more instructions that are specific to the web page, a website that includes the web page, or a domain to which the web page belongs.

3. The computer implemented method of claim 1, wherein the step of determining that the input field in the web page is of the specific type further comprises determining that the input field is not currently hidden from view.

4. The computer implemented method of claim 1, further comprising detecting, using at least one processor, a change in a document object model of the web page, wherein the step of determining that the input field in the web page is of the specific type is performed based on the step of detecting the change in the document object model of the web page.

5. The computer implemented method of claim 1, wherein the step of generating the combo box for presenting the at least one input suggestion comprises generating the combo box as a display overlay that is independent from the web page.

6. The computer implemented method of claim 1, wherein the step of generating the combo box for presenting the at least one input suggestion comprises generating the combo box in a format for display by a plug-in extension of a web browser used to display the web page.

7. The computer implemented method of claim 1, wherein the step of generating the combo box for presenting the at least one input suggestion comprises generating the combo box in a format suitable for being input into a document object model of a web browser used to display the web page.

8. The computer implemented method of claim 1, wherein the information pertaining to the presentation of the input field in the web page comprises font of the input field, background of the input field, border of the input field, color of the input field, size of the input field, style of the input field, or any combination thereof.

9. The computer implemented method of claim 1, wherein the information is transferred from cascading style sheets to a native format of a renderer used to render the combo box.

10. The computer implemented method of claim 1, wherein the combo box comprises a text entry field and an input suggestion indicator, and wherein visibility and interaction capabilities of the text entry field are caused to be blocked.

11. A computer implemented method for displaying and collecting input suggestions, the method comprising:

receiving, through an input device on a user device, at least one input suggestion associated with an input field in a web page, the at least one input suggestion being stored in one or more databases on a remote computing system;

generating, using at least one processor, a combo box for presenting the at least one input suggestion by copying or utilizing information pertaining to the presentation of the input field in the web page;

rendering the combo box, by a web browser engine, by copying the information into the combo box; and displaying, on at least one presentation component, the combo box in conjunction with the web page;

wherein the one or more databases are automatically updated to include, as associated with the web page, user input that is entered into the combo box, submitted through the web page, and determined to be absent from the one or more databases.

12. A computer implemented method for displaying input suggestions stored on a remote computing system for entry into a specific type of input field, the method comprising:

receiving, through an input device on a user device, at least one input suggestion for entry into a specific type of input field, the at least one input suggestion being stored on the remote computing system;

upon the user device requesting or accessing a web page, determining using at least one processor whether any input fields in the web page are of the specific type and are not hidden from view;

for each input field determined to be of the specific type and not hidden from view, generating using at least one processor, a combo box for presenting the at least one input suggestion by copying or utilizing information pertaining to the presentation of the input field in the web page, the combo box comprising one or more user interface elements that are independent from the web page and providing a modified display to highlight each input field;

rendering the combo box, by a web browser engine, by copying the information into the combo box;

causing, using at least one processor, the combo box to be displayed with the web page on at least one presentation component in such a way that the combo box overlays the input field of the web page; and using at least one processor, duplicating in the input field of the web page any user input in the combo box;

wherein if a user selects an input field of the specific type and not hidden from view, a list of suggestions is displayed.

13. A computer implemented method for displaying input suggestions stored on a remote computing system for entry into a specific type of input field, the method comprising:

a user device receiving, through an input device, at least one input suggestion for entry into a specific type of input field, the at least one input suggestion being stored on the remote computing system;

upon the user device requesting or accessing a web page, determining using at least one processor that an input field in the web page is of the specific type;

based on the step of determining that the input field in the web page is of the specific type, generating using at least one processor an input suggestion indicator for presenting the at least one input suggestion by copying or utilizing information pertaining to the presentation of the input field in the web page and causing the input suggestion indicator to be included in a display with the web page in conjunction with the input field; and wherein the combo box is rendered by a web browser engine and the information is copied by the web browser engine into the combo box; and using at least one processor, causing the at least one input suggestion to be presented in the input suggestion indicator.

14. The computer implemented method of claim 13, wherein the at least one input suggestion is caused to be presented based on user input entered into the input field of the web page.

15. The computer implemented method of claim 13, wherein the input suggestion indicator is caused to be included in the display with the web page based on user input entered into the input field of the web page.

16. One or more computer storage devices containing downloadable instructions stored thereon, wherein execution of the instructions by at least one processor causes the method of claim 1 to occur.

17. A computer implemented method for displaying input suggestions stored on a remote computing system for entry into a specific type of input field, the method comprising:
- sending, through an output device and to a user device, at least one input suggestion for entry into a specific type of input field, the at least one input suggestion being stored on the remote computing system;
- upon the user device requesting or accessing a web page, determining using at least one processor that an input field in the web page is of the specific type; and
- based on the step of determining that the input field in the web page is of the specific type, generating using at least one processor, a combo box for presenting the at least one input suggestion by obtaining a screenshot of the input field and using the screenshot to render the combo box and causing the combo box to be included in a display with the web page in such a way that the combo box visually replaces the input field in the display;
- wherein user input in the combo box is enabled to be submitted through the web page.

* * * * *